United States Patent
Kikkoji et al.

(10) Patent No.: US 7,698,005 B2
(45) Date of Patent: Apr. 13, 2010

(54) RECEPTION DEVICE AND MANAGEMENT DEVICE OF SERVICE ADVERTISEMENT INFORMATION

(75) Inventors: Hiroyuki Kikkoji, Tokyo (JP); Nozomu Okuzawa, Tokyo (JP)

(73) Assignee: Sony Corporation, Tokyo (JP)

( * ) Notice: Subject to any disclaimer, the term of this patent is extended or adjusted under 35 U.S.C. 154(b) by 392 days.

(21) Appl. No.: 10/573,647

(22) PCT Filed: Jul. 6, 2004

(86) PCT No.: PCT/JP2004/009892

§ 371 (c)(1),
(2), (4) Date: Mar. 28, 2006

(87) PCT Pub. No.: WO2005/033995

PCT Pub. Date: Apr. 14, 2005

(65) Prior Publication Data

US 2007/0124429 A1    May 31, 2007

(30) Foreign Application Priority Data

Sep. 30, 2003    (JP) .............................. 2003-339703

(51) Int. Cl.
*G06F 17/00*    (2006.01)
*G06F 15/16*    (2006.01)

(52) U.S. Cl. ........................................ 700/90; 709/219
(58) Field of Classification Search .................... 700/8, 700/11, 17, 18, 90; 705/72–76, 10, 14; 725/42; 709/219
See application file for complete search history.

(56) References Cited

U.S. PATENT DOCUMENTS

| | | | |
|---|---|---|---|
| 6,574,793 B1 * | 6/2003 | Ngo et al. | 725/32 |
| 7,134,132 B1 * | 11/2006 | Ngo et al. | 725/34 |
| 7,162,226 B2 * | 1/2007 | Papulov | 455/414.3 |
| 2002/0036655 A1 * | 3/2002 | Yulevich et al. | 345/744 |

(Continued)

FOREIGN PATENT DOCUMENTS

JP    11-065950    3/1999

(Continued)

OTHER PUBLICATIONS

Human Translation of JP 2003-067289—"A Web Advertisement Delivery System".*

(Continued)

*Primary Examiner*—Ryan A Jarrett
(74) *Attorney, Agent, or Firm*—Oblon, Spivak, McClelland, Maier & Neustadt, L.L.P.

(57) ABSTRACT

A transmission unit of an information processing device transmits user identification information which identifies users, a password, and device identification information which identifies the information processing device to a management device which manages the information processing device. A receiving unit receives registration completion information which indicates that the user identification information, the password and the device identification information were associated with each other and registered at the management device. A storage unit stores device identification information transmitted by the transmission unit into a storage medium. A control unit controls the transmission unit to transmit device attribute information which indicates the attributes of the information processing device and request information which requests advertisement information in the event that the device identification information is not stored by the storage unit.

16 Claims, 13 Drawing Sheets

U.S. PATENT DOCUMENTS

| | | | |
|---|---|---|---|
| 2002/0059116 A1* | 5/2002 | Bulatovic et al. | 705/27 |
| 2003/0083937 A1* | 5/2003 | Hasegawa et al. | 705/14 |
| 2005/0060701 A1 | 3/2005 | Murase | |
| 2005/0091679 A1 | 4/2005 | Tanaka et al. | |

FOREIGN PATENT DOCUMENTS

| | | |
|---|---|---|
| JP | 2002-149598 | 5/2002 |
| JP | 2002-342419 | 11/2002 |
| JP | 2003-67289 | 3/2003 |
| JP | 2003-242018 | 8/2003 |
| JP | 2003-256062 | 9/2003 |

OTHER PUBLICATIONS

Machine Translation of JP 2003-242018.*
U.S. Appl. No. 11/560,249, filed Nov. 15, 2006, Terada et al.
U.S. Appl. No. 10/526,902, filed Aug. 16, 2005, Yamashita et al.
U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.

* cited by examiner

NowOnAir INFORMATION WILL BE CLIPPED TO YOUR CLIP FOLDER

| STARTED | SONG TITLE | ARTIST NAME |
|---|---|---|
| 13:24 | Sign | RINGO PATENT |
| 13:18 | THE TWO OF US | JOHN INVENTOR |
| 13:16 | YOUR NAME | PAUL ASSIGNEE |

CLOSE

USE DIRECTION KEYS TO SELECT, AND CONFIRMATION KEY TO CONFIRM      10:10AM

NowOnAir INFORMATION HAS BEEN CLIPPED TO YOUR CLIP FOLDER

CLIP INFORMATION
STATION NAME        TFM
SONG TITLE          Sign
ARTIST NAME         RINGO PATENT
TIME                13:24, OCTOBER 1 20**
CLIP DESIGNATION    CLIP FOLDER

CLOSE

USE DIRECTION KEYS TO SELECT, AND CONFIRMATION KEY TO CONFIRM    10:10AM

RECEPTION DEVICE AND MANAGEMENT DEVICE OF SERVICE ADVERTISEMENT INFORMATION

TECHNICAL FIELD

The present invention relates to an information processing device, an information management device, a communication method for the information processing device, a communication method for the information management device, a communication program for the information processing device, and a communication program for the information management device. More particularly, the present invention relates to an information processing device, an information management device, a communication method for the information processing device, a communication method for the information management device, a communication program for the information processing device, and a communication program for the information management device for transmitting and receiving service advertisement information.

BACKGROUND ART

Presently, various music-related services are available on the Internet. For example, there are services that deliver song information, audio data and the like contained in CDs (Compact Disc) currently available, and services that provide information related to a song currently on air on radio programs including name of song or performer, and name or number of the CD containing the song (NowOnAir). In addition, some services deliver digital data of songs, while others accept orders for CD mail-order businesses.

There are information processing devices, for example audio equipment, which can receive such services. Through user registration with an information management device which provide service from information processing device, for example a server, a user can receive various services. It is desirable that the information management device transmits advertisement information regarding their services to users (information processing devices) who have not yet completed user registration.

Meanwhile, there exists a storage medium that allows more effective demonstrations while keeping costs at a minimum. The storage medium stores identification information indicating that the medium is to be used for demonstration. For example, a video camera may be arranged to switch to demonstration mode once identification information recorded on the storage medium loaded into the video camera is identified (for example, refer to Patent Document 1).

Patent Document 1: Japanese Patent Laid-Open No. 2001-203963 (paragraphs 0161-0164, FIG. 14).

However, when services are provided in response to a user's input of his or her user ID or other user identification information, determination of whether the user has already completed user registration or not can only be achieved after the user inputs such user identification information into an information processing device. Therefore, there was a problem wherein users who have not completed user registration were unable to receive at their information processing devices advertisement information encouraging them to join the services.

Another problem was that, for some information processing devices, their performance and functionalities made it difficult for them to receive advertisement information.

DISCLOSURE OF THE INVENTION

The present invention has been made in consideration of the above, and its purpose is to facilitate reception of advertisement information on services when users have not yet completed user registration, and to provide an information processing device, an information management device, a communication method for an information processing device, a communication method for an information management device, a communication program for an information processing device, and a communication program for an information management device which enable reception of advertisement information depending on their respective performances and functionalities.

According to the present invention, in order to solve the above problems, an information processing device which receives advertisement information of services comprises: transmission means for transmitting user identification information which identifies users, a password, and device identification information which identifies the information processing device to a management device which manages the information processing device; receiving means for receiving registration completion information which indicates that the user identification information, password and device identification information were associated with each other and registered at the management device; storage means for storing at least the device identification information; and control means for controlling the transmission means to transmit device attribute information which indicates the attributes of the information processing device and request information which requests advertisement information in the event that device identification information is not stored in the storage means, and is arranged so that the receiving means receives advertisement information corresponding to device attribute information in response to such request information.

The information processing device transmits user identification information which identifies users, a password, and device identification information which identifies the information processing device to a management device which manages the information processing device, and stores at least the device identification information. In addition, when no device identification information is stored, it transmits device attribute information that indicates the attributes of the information processing device and request information which requests advertisement information to the management device, and receives advertisement information corresponding to the device attribute information.

According to the information processing device of the present invention, user identification information, a password, and device identification information is transmitted to the management device, and at least the device identification information is stored. This enables determination of whether or not a user has completed user registration to be achieved by checking whether device identification information is stored or not, and facilitates reception of advertisement information in the event that a user has not completed user registration with the management device.

In addition, since device attribute information that indicates the attributes of the information processing device is transmitted, and advertisement information corresponding to the device attribute information is received, such advertisement information can be received depending on performances and functionalities.

BRIEF DESCRIPTION OF THE DRAWINGS

FIG. 12 is a third diagram showing an exemplary screen of an auto demo; and

FIG. 13 is a fourth diagram showing an exemplary screen of an auto demo.

BEST MODE FOR CARRYING OUT THE INVENTION

Figure 1:
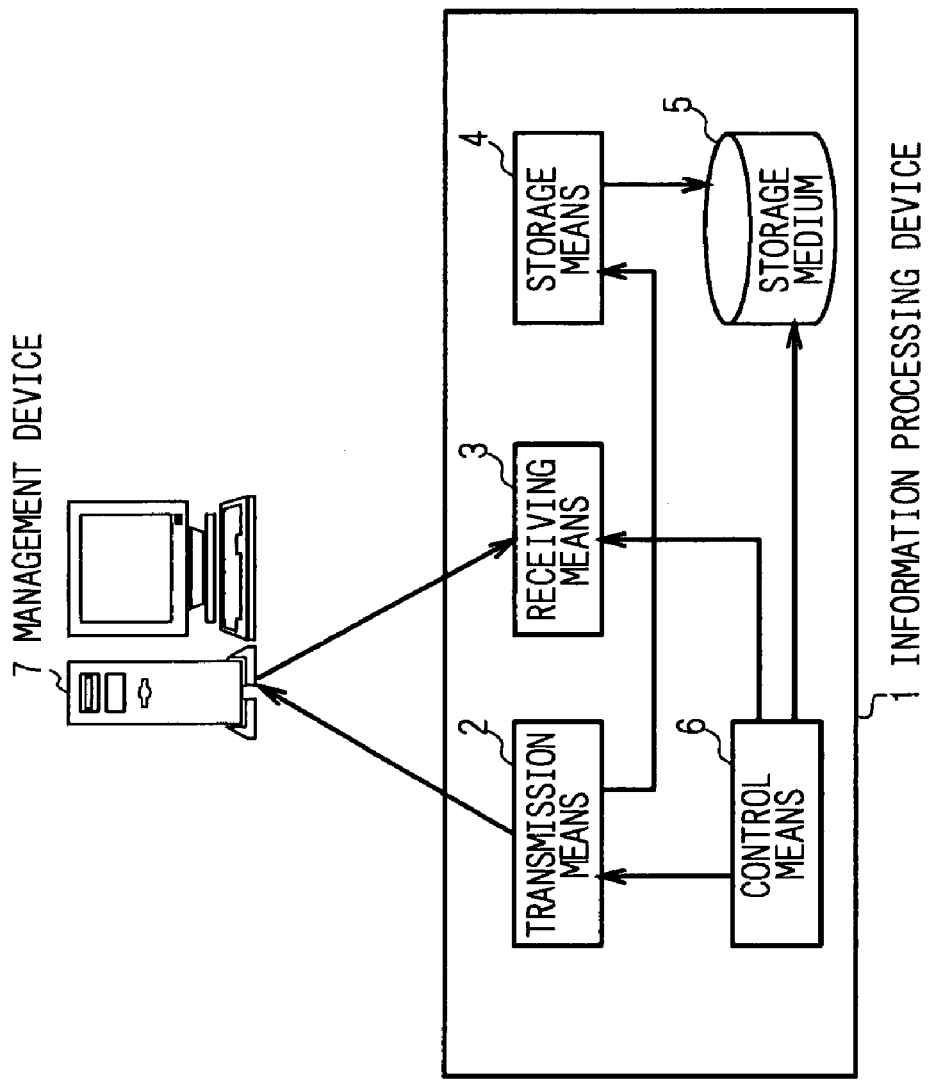
FIG. 1 is a principle diagram explaining the principle of the present invention.

The principle of the present invention will now be described in detail with reference to a drawing. FIG. 1 is a principle diagram explaining the principle of the present invention. As shown in FIG. 1, an information processing device 1 comprises a transmission means 2, a receiving means 3, a storage means 4 and a control means 6. The information processing device 1 and a management device 7 are interconnected, and are able to communicate with each other.

For users who have completed user registration, the management device 7 provides services such as songs or NowOnAir to the information processing device 1. For users who have not completed user registration, the management device 7 transmits advertisement information to the information processing device 1 in order to encourage users to complete user registration (or join the service).

The transmission means 2 transmits user identification information that identifies users, a password, and device identification information which identifies the information processing device 1 to the management device 7 which manages the information processing device 1. The receiving means 3 receives registration completion information that indicates that the user identification information, password and device identification information were associated with each other and registered at the management device 7.

The storage means 4 stores the device identification information transmitted by the transmission means 2 to a storage medium 5. The control means 6 controls the transmission means 2 to transmit device attribute information which indicates the attributes of the information processing device 1 and requests information which requests advertisement information in the event that device identification information is not stored by the storage means 4. Device attribute information is, for example, the performance and functionalities of a display device included in the information processing device 1.

After the transmission means 2 transmits request information under the control of the control means 6, the receiving means 3 receives advertisement information corresponding to the device attribute information from the management device 7.

The operation of the principle diagram will now be described. Upon user registration, a user inputs user identification information, a password and device identification information to the information processing device 1. The transmission means 2 transmits the user identification information, password, and device identification information to the management device 7. From the management device 7, the receiving means 3 receives registration completion information indicating that the user identification information, password and device identification information were associated with each other and registered. The storage means 4 stores the device identification information transmitted by the transmission means 2 to the storage medium 5. Therefore, device identification information is stored in the storage medium 5 only upon user registration by a user with the management device 7. If a user has not completed user registration, device identification information is not stored in the storage medium 5.

When the device identification information is not stored by the storage means 4, the control means 6 controls the transmission means 2 to transmit device attribute information which indicates the attributes of the information processing device 1 and request information which requests advertisement information.

As described above, when device identification information is not stored, i.e. when a user has not yet registered with the management device 7, the information processing device 1 transmits device attribute information which indicates the attributes of the information processing device and request information which requests advertisement information to the management device 7. The receiving means 3 then receives advertisement information corresponding to the device attribute information from the management device 7. Thus, determination of whether a user has completed user registration or not can be achieved by checking whether device identification information is stored in the storage medium 5 or not, and reception of advertisement information in the event that a user has not completed user registration with the management device 7 can be easily performed.

Additionally, since the information processing device 1 transmits device attribute information indicating its own attributes and receives advertisement information corresponding to the device attribute information, it can now receive advertisement information according to its performance and functionalities.

Next, an embodiment of the present invention will be described in detail with reference to a drawing. In the following description, the process of saving information related to a song or a set of songs will be referred to as clipping.

Figure 2:
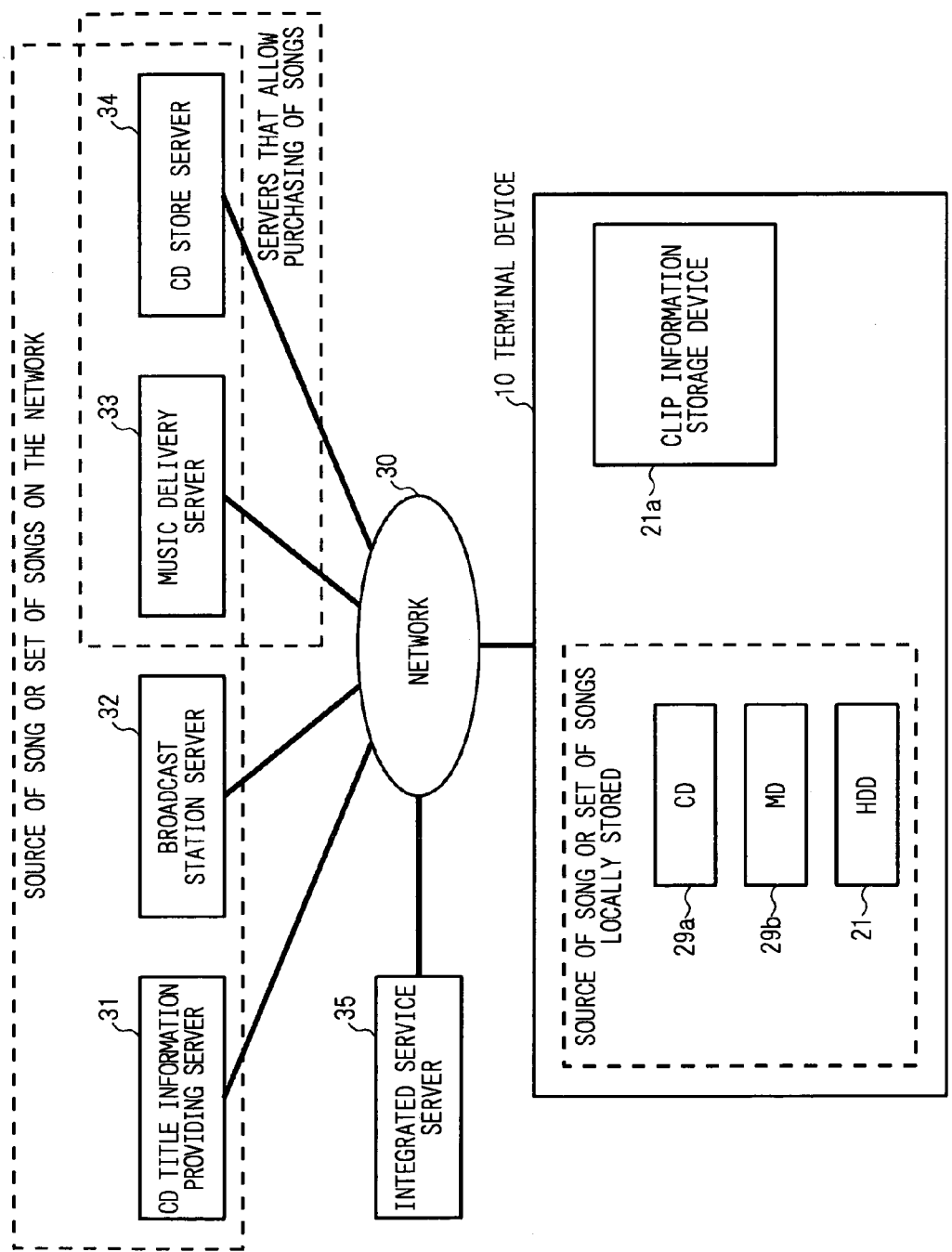
FIG. 2 is a diagram showing a network system according to an embodiment of the present invention.

FIG. 2 is a diagram showing a network system according to an embodiment of the present invention. A terminal device 10 is connected via a network 30 to various servers. The network 30 is, for example, the Internet. Examples of servers include a CD title information providing server 31, a broadcast station server 32, a music delivery server 33, a CD store server 34, and an integrated service server 35.

The CD title information providing server 31 provides delivery service of information of songs contained in commercially available CDs. The broadcast station server 32 is a server managed by broadcast stations which broadcast FM radio, television or the like, and provides information related to songs aired during their programs.

The function of the broadcast station server 32 for providing related information can be roughly divided into two functions. The first is a function that provides NowOnAir of programs currently on air. The second is a function that provides related information on songs already aired (OnAirList), in response to requests from the terminal device 10 (the OnAirList includes related information on each song). For example, the broadcast station server 32 provides information related to songs aired on a specified program, or information related to songs aired during a designated time slot.

The music delivery server 33 is a server that provides delivery service of digital data of songs (song data). For example, the music delivery server 33 provides song data only to a terminal device 10 of a user that has gone through the purchasing procedure of that song. The music delivery server 33 can also provide related information of delivered songs.

The CD store server 34 is a server that accepts orders and the like for CD mail-order businesses. The CD store server 34 also provides a delivery service of sample audio data, or a service for providing information related to songs contained in a currently available CD.

The integrated service server 35 functions as a window (portal site) for providing services via the network 30, and mediates the provision of various integrated services. For example, the integrated service server 35 delivers information indicating the source of related information of songs on air (e.g. URL (Uniform Resource Locator)) to the terminal device 10.

As seen, a plurality of servers offers services for providing related information on a song or a set of songs on the network 30. In other words, each server functions as a source for a song or a set of songs on the network 30.

The music delivery server 33 and the CD store server 34 are servers that allow purchasing of songs. Therefore, a user may actually purchase a song or a set of songs via the network 30 by operating the terminal device 10 and accessing a server allowing purchasing of songs. By going through a purchasing procedure with the music delivery server 33, the user of the terminal device 10 can download song data from the music delivery server 33. In addition, the user of the terminal device 10 can have CDs delivered to his or her home by going through a purchasing procedure with the CD store server 34.

The terminal device 10 retains the sources of a locally stored song or set of songs in a storage medium such as a CD 29a, MD (Mini Disc) 29b and hard disk drive (HDD) 21. The CD 29a and the MD 29b are portable storage mediums, and can be easily attached to and removed from the terminal device 10. The type of local sources prepared for the terminal device 10 varies, depending on the type and purpose of the terminal device 10.

The sources of the song or set of songs locally stored depicted in FIG. 2 are exemplary. As long as a storage medium exists locally in relation to the terminal device 10, storing a song or a set of songs therein will enable the storage medium to function as a source of a local song or set of songs.

In addition, the terminal device 10 comprises a clipped information storage device 21a which stores clipped related information. The clipped information storage device 21a is a secondary storage device to the terminal device 10. For example, a portion of the storage area of HDD 21 and the like may be made to function as the clipped information storage device 21a. By the way, the terminal device 10 is can perform clipping on both songs and set of songs. This allows the use of volume clipping for FM programs and CD albums which contain many songs of interest, where one clipping operation records all related information on the set of songs of interest.

Figure 3:
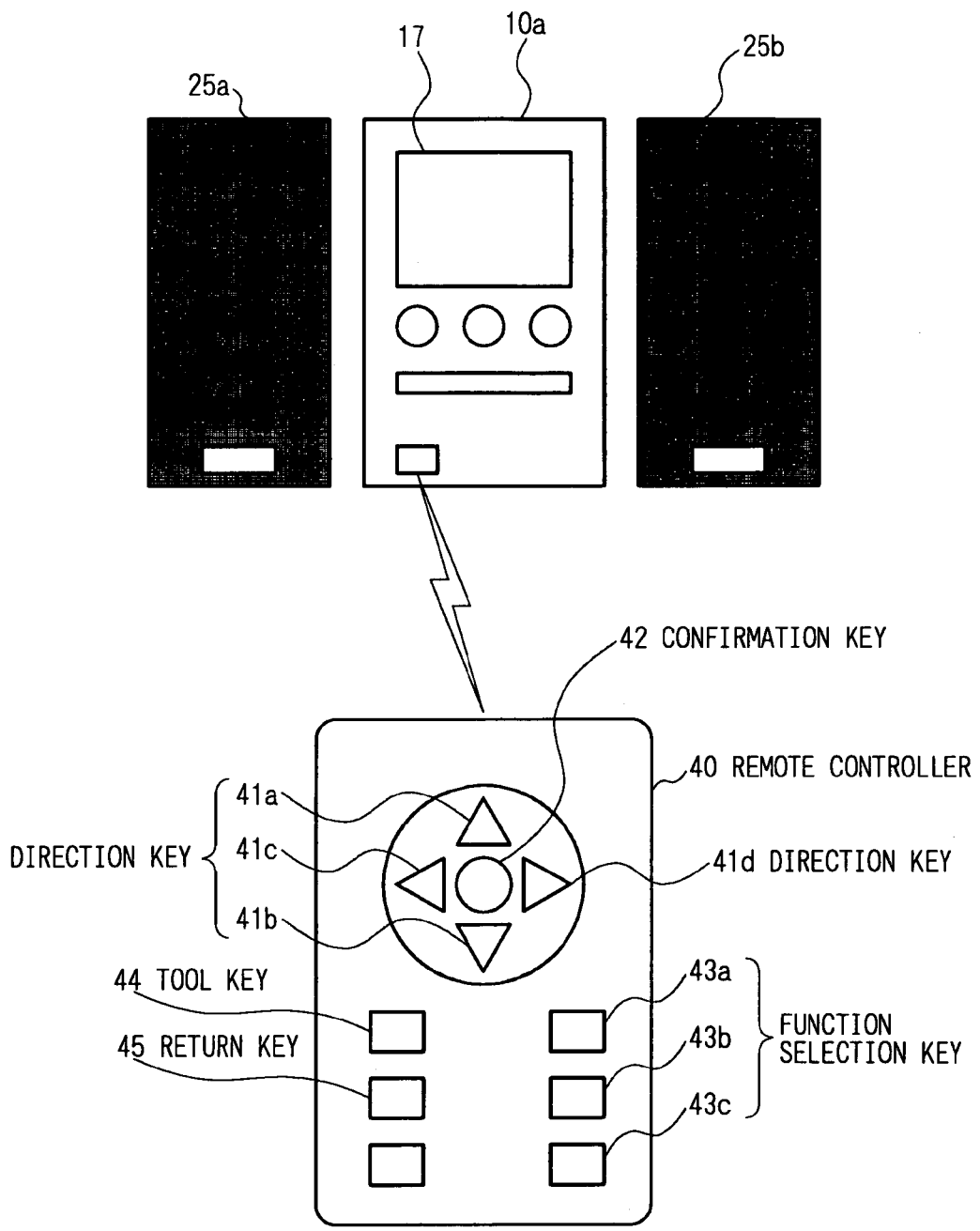
FIG. 3 is an external view of a terminal device.

By the way, the terminal device 10 according to the present embodiment also functions as an audio device with a song playback function. FIG. 3 is an external view of the terminal device. As shown in FIG. 3, the terminal device 10 according to the present embodiment externally resembles a typical music center. The terminal device 10 comprises a device main body 10a, speakers 25a and 25b, and a remote controller 40. The device main body 10a is equipped with a function to playback CDs or DVDs (Digital Versatile Discs), a function to playback and record on MDs, and a function to receive FM and TV broadcasts. Audio signals generated by the device main body 10a are transmitted to speakers 25a and 25b where they are outputted.

The device main body 10a also comprises a display device 17. The display device 17 displays information related to the song currently played, or related information and the like stored through clipping. The remote controller 40 is an input device for remotely controlling the device main body 10a. The remote controller 40 is provided with a plurality of operation keys. When an operation key is pressed by the user, a signal corresponding to the pressed operation key is transmitted from the remote controller 40 to the device main body 10a using infrared or other wireless communication means.

operation keys include direction keys 41a to 41d, a confirmation key 42, function selection keys 43a to 43c, a tool key 44 and a return key 45. The direction keys 41a to 41d are used, for example, to move a cursor displayed on the display device 17, or to move an area to be focused. The four direction keys 41a to 41d respectively correspond to up, down, left and right directions, and the cursor or the like is moved in the direction corresponding to the pressed direction key.

The confirmation key 42 is used, for example, to finalize the content displayed on the display device 17. The function selection keys 43a to 43c are used to select functions. For example, the three function selection keys 43a to 43c respectively correspond to an integrated service using function, a tuner function and a local content management function. In addition, when one of the function selection keys 43a to 43c is pressed, the device main body 10a assumes the operation mode of the function corresponding to the pressed function selection key.

The tool key 44 is a button to display a tool menu on the display device 17. The tool menu displays commands corresponding to the content displayed on the display device 17. The user can select any command from the tool menu to have the terminal device 10 execute processing corresponding to that command. For example, when the user operates the direction keys 41a to 41d to select any command, and then presses the confirmation key 42, the terminal device 10 will execute processing corresponding to that command.

The return key 45 is a button for returning the content displayed on the display device 17 to its previous state. In addition to those shown in FIG. 3, the remote controller 40 may be equipped with other various operation keys. Examples of such operation keys include a volume control key, a play key for playing a CD and the like, and a stop key.

Figure 4:
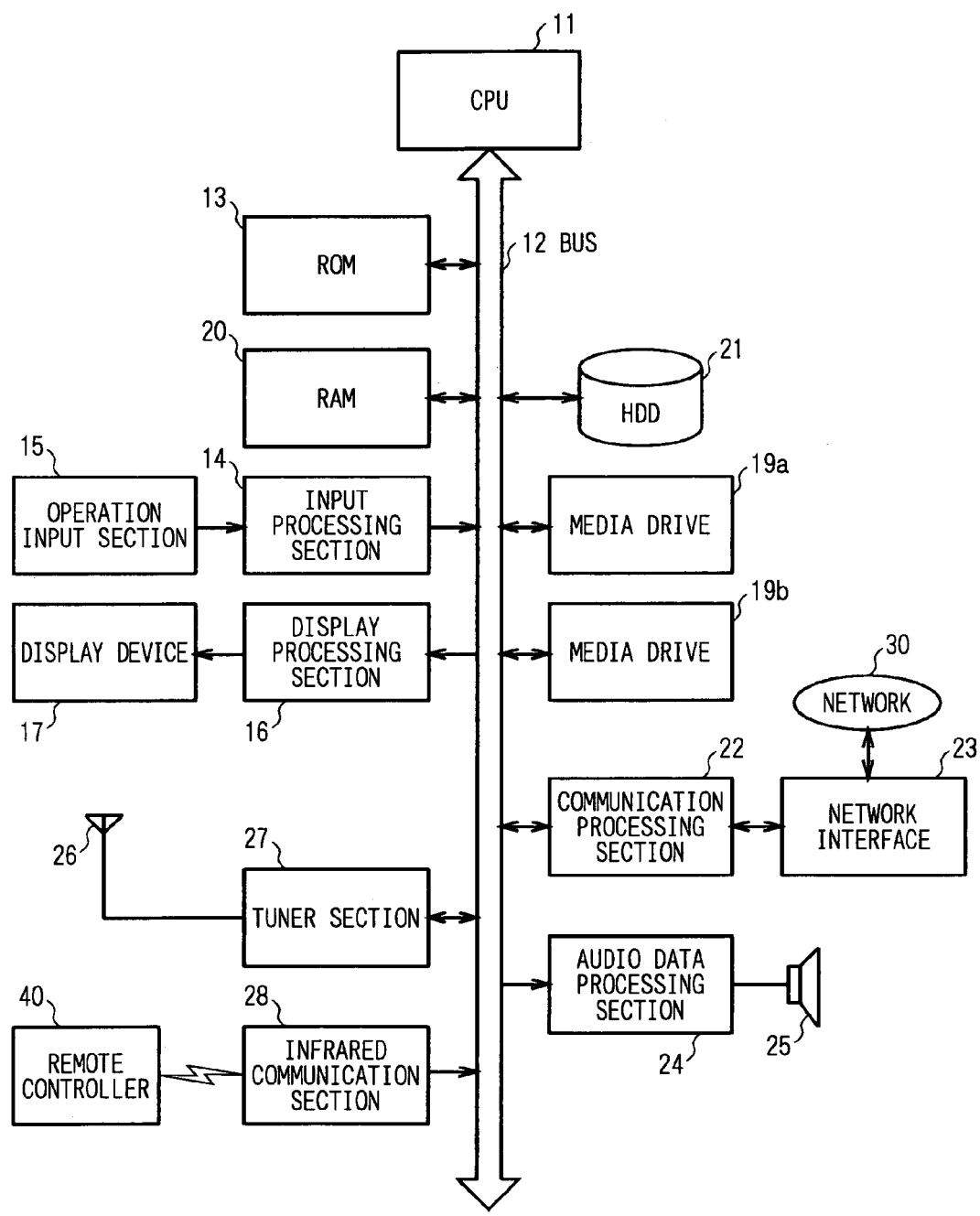
FIG. 4 is a hardware block diagram of a terminal device.

Next, the internal configuration of the terminal device 10 will be described. FIG. 4 is a hardware block diagram of a terminal device. A terminal device 10 as shown in FIG. 4 enables managing, storing and playing various sources such as songs. A CPU 11 handles overall control and arithmetic processing of the terminal device 10 based on a launched program. For example, the CPU 11 performs communication operations via the network 30, input and output operations in regards to the user, playing and clipping of contents acquired from a media, storage of contents to the HDD 21 and management of such storage, and information search via the network 30 based on clipped information and the like. Recordable and playable content data supported by the terminal device 10 according to the present embodiment include audio and video content data. The CPU 11 exchanges control signals and data with each circuit component via a bus 12.

Operation programs and program loaders to be executed by the CPU 11, various computation coefficients, and parameters and the like used in programs are stored in a ROM (Read Only Memory) 13. Programs to be executed by the CPU 11 will be deployed in a RAM 20. The RAM 20 is also used as a data area or task area that will be required when the CPU 11 performs various processing.

An operation input section 15 comprises various manipulators and the like such as operation keys, a jog dial, a touch panel or the like provided on the chassis of the terminal device 10. A keyboard or a mouse for GUI (Graphical User Interface) operations may be provided as the operation input section 15. Information input at the operation input section 15 will undergo predetermined processing at an input processing section 14 before being transmitted as an operation command to the CPU 11. The CPU 11 performs predetermined computation and control to ensure that the operation of the device is in response to the input operation command.

A display device such as a liquid crystal display is connected as the display device 17 to display various information. When the CPU 11 supplies a display processing section 16 with display information based on various statuses of operation, input or communication, the display processing section 16 instructs the display device 17 to perform display operations based on the supplied display data. For example, contents of related information delivered by a server and the like, or contents of clipped information are displayed on the display device 17. In addition, when a song search via the network 30 is performed, the result of the search will be displayed on the display device 17.

Media drives 19a and 19b are drives that are able to record and play (some storage media only allow playing) contents such as songs stored in a portable storage medium. By the way, storage media recordable or playable on each media drive 19a and 19b is not restricted to only one type. In other words, the media drives may record and play storage media of various types. For example, the media drive 19a may play CDs and DVDs, while the media drive 19b may record and play MDs.

Portable storage media for storing contents such as songs and the like should not be limited to optical storage media such as CDs and DVDs. For example, contents may be stored in storage media comprising semiconductor memories such as a flash memory. In this case, a flash memory reader/writer is connected to the bus 12.

By inserting a storage medium (CD, DVD, MD and the like) containing any content into the media drive 19a or 19b, and performing predetermined operations using the remote controller 40, the user may enjoy songs or the like. For example, when the user operates the remote controller 40 to give the media drive 19a playback instructions, the CPU 11 instructs the media drive 19a to play contents. In response, the media drive 19a accesses and reads a designated content from the mounted storage medium.

If the content read in this way is an audio content, the content is forwarded to an audio data processing section 24 after undergoing processing such as decoding by CPU 11, when necessary. At the audio data processing section 24, the content undergoes acoustic field processing such as equalizing, volume control, D/A conversion, amplification and the like, and then output from the speaker section 25. As shown in FIG. 3, the speaker section 25 is comprised of a plurality of speakers 25a and 25b, and is capable of providing stereo output.

Contents played by the media drives 19a and 19b can be accumulated as audio data files in the HDD 21 under the control of the CPU 11. The format of the audio data file may adopt the CD format of a 44.1 KHz sampling frequency and 16-bit quantization. Alternatively, in order to save space on the HDD 21, the compressed audio data may be in a compressed format based on predetermined methods. Compression methods which can be used in this case include the ATRAC (Advanced Transform Acoustic Coding, trademark) method or the MP3 (MPEG Audio Layer-3) method.

A tuner section 27 may be, for example, an AM or FM radio tuner, and under the control of the CPU 11, demodulates broadcast signals received by an antenna 26. The tuner may also be a television tuner, satellite broadcast tuner or a digital broadcast tuner and the like. The demodulated broadcast audio signal undergoes predetermined processing at the audio data processing section 24, and is then output from the speaker section 25 as broadcast audio.

A communication processing section 22 performs encoding of data to be transmitted and decoding of received data based on the control of the CPU 11. A network interface 23 transmits data to be transmitted that is encoded by the communication processing section 22 to a predetermined device supporting an external network via the network 30. The network interface 23 forwards signals transmitted by the external network-supporting device to the communication processing section 22 via the network 30. The communication processing section 22 forwards the received information to the CPU 11. Information received via the network 30 includes, for example, information relating to programs currently on air on FM or the like, or information of songs contained in a CD or the like.

An infrared communication section 28 performs communication with the remote controller 40 using wireless communication means such as infrared. The infrared communication section 28 also performs predetermined processing on signals transmitted from the remote controller 40, and in turn transmits the signal as an operation command to the CPU 11. The CPU 11 performs predetermined computation and control to ensure that the operation of the device is in response to the input operation command.

The configuration of the terminal device 10 is not restricted to the configuration shown in FIG. 4, and allows many variations. For example, interfaces to peripheral devices using communication methods such as USB (Universal Serial Bus), IEEE1394 and Bluetooth may be provided. Audio contents downloaded through the above-mentioned network interfaces 23 via the network 30, as well as audio contents transferred via interfaces such as USB or IEEE1394 mentioned above may be stored in the HDD 21. In addition, a terminal for connecting a microphone or an external headphone, a video output terminal supporting DVD playback, a line connecting terminal, or an optical digital connecting terminal and the like may be provided. Furthermore, a PCMCIA slot, a memory card slot and the like may be formed to allow data transfer with external information processing devices or audio devices.

Next, a configuration of program modules according to a system of the present embodiment will be described. Program modules are information describing processing to be executed by the terminal device 10. The terminal device 10 achieves predetermined functions based on such program modules. In the following description, a function realized by executing the corresponding program module will be referred to by the name of that program module.

Figure 5:
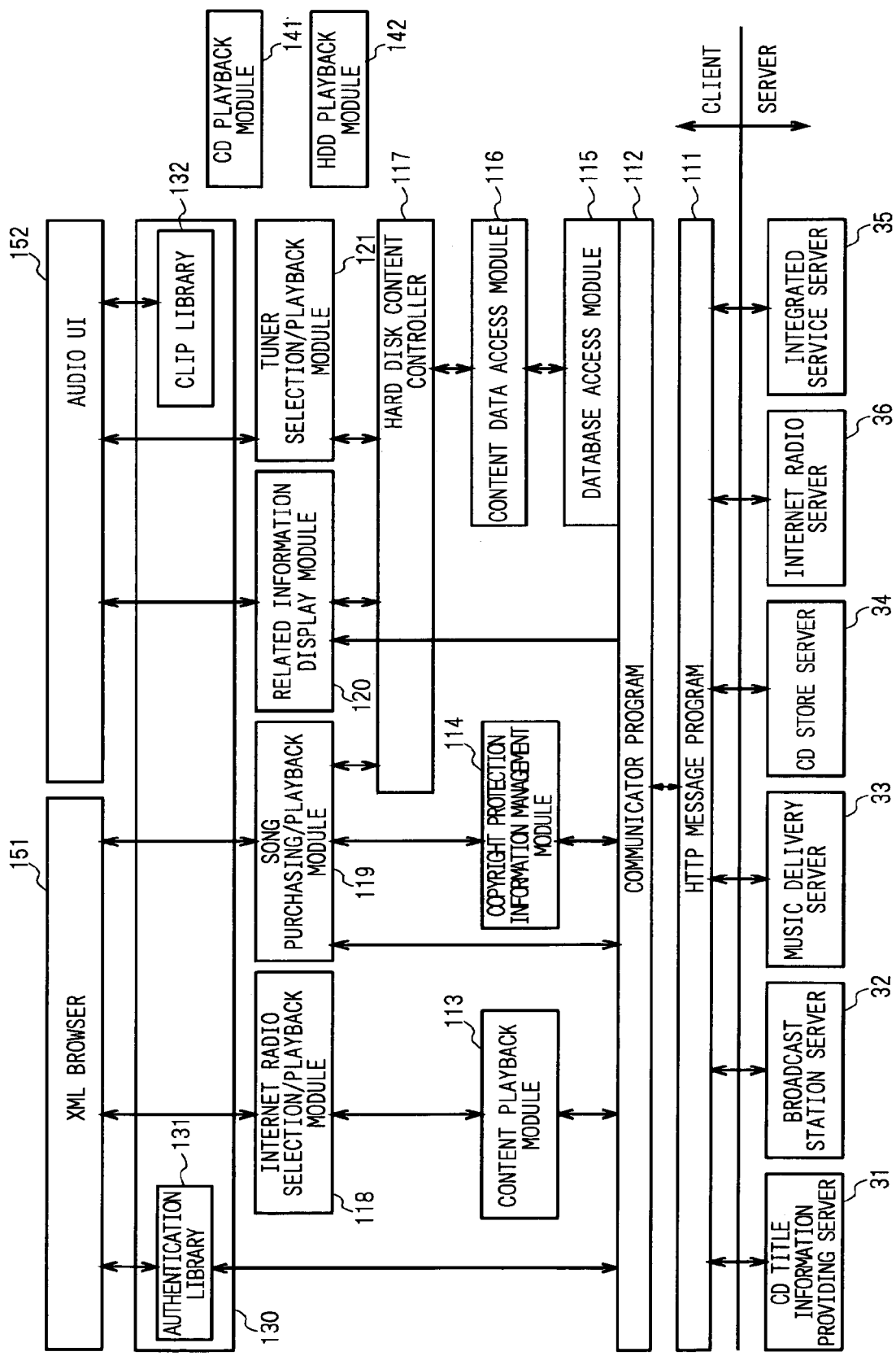
FIG. 5 is a diagram depicting a program module configuration of a terminal device.

FIG. 5 is a diagram depicting a program module configuration of the terminal device 10. As shown in FIG. 5, the program modules of the terminal device 10 are configured to run on an OS. Owing to the functions of various program modules, the terminal device 10 is able to communicate with a CD title information providing server 31, a broadcast station server 32, a music delivery server 33, a CD store server 34, an integrated service server 35, an Internet radio server 36 and other various servers.

An HTTP (Hyper Text Transfer Protocol) message program 111 enables HTTP-based communication with the CD title information providing server 31, the broadcast station server 32, the CD store server 34, the integrated service server 35 and other various servers. A communicator program 112 is a communication module enabling various communications with the integrated service server 35 and the like.

Located above (indicating a function closer to a user interface) the communicator program 112 are a content playback module 113 that interprets and plays codec of contents, and a copyright protection information management module 114 that handles information related to copyright protection. Provided above the content playback module 113 is an Internet radio selection/playing module 118 that selects and plays an Internet radio station. Provided above the copyright protection information management module 114 is a song purchasing/playing module 119 that purchases songs and plays sample songs.

Furthermore, an XML (extensible Markup Language) browser 151 is provided above the Internet radio selection/playing module 118 and the song purchasing/playing module 119. The XML browser 151 interprets the contents of XML files transmitted from the various servers, and displays such contents on the display device 17. The XML browser 151 interprets the contents of the user's input to the terminal device 10 while the terminal device 10 is in integrated service using mode. The XML browser 151 then hands processing requests and the like corresponding to the input contents to other modules. For example, songs selected by the user via the XML browser 151 is processed for purchasing at the song purchasing/playing module 119, and written into the HDD 21 via a hard disk content controller 117.

An authentication library 131 of a library 130 is connected to the communicator program 112. The authentication library 131 performs authentication on behalf of the integrated service server 35 and other various servers.

Provided above the communicator program 112 is a database access module 115, a content data access module 116 and a hard disk content controller 117. The database access module 115 accesses various databases built into the HDD 21. The content data access module 116 accesses contents stored in the HDD 21. The hard disk content controller 117 manages contents stored in the HDD 21.

Provided above the hard disk content controller 117 is a related information displaying module 120, a tuner selection/playing/recording module 121 and a song purchasing/playing module 119. The related information displaying module 120 displays titles of songs aired by a radio station, and the name of artists on the display device 17. The tuner selection/playing/recording module 121 selects a radio station, and records contents of songs received from that radio station onto the HDD 21.

For example, songs received from a radio station selected via an audio user interface (Audio UI) 152 are written into the HDD 21 via the content data access module 116.

With the tuner selection/playing/recording module 121, the related information displaying module 120 receives as related information title of songs and artist names currently on air on a radio station from the CD title information providing server 31 and the broadcast station server 32 or the like via the HTTP message program 111, and displays the related information on the display device 17 via the audio user interface 152.

Related information displayed on the display device 17 via the audio user interface 152 may be temporarily stored in the clip library 132 of the library 130. In addition, if so instructed by the user, related information may be eventually stored in the HDD 21 via the database access module 115.

Furthermore, program modules of the terminal device 10 include a CD playback module 141 for playing CDs and an HDD playback module 142 for playing the HDD 21. Playback results are output via the audio data processing section 24 and the speaker section 25.

With a terminal device 10 thus configured, related information can be obtained from a server, which in turn may be clipped by the user. Song search or purchasing may be performed simultaneously while clipping.

Figure 6:
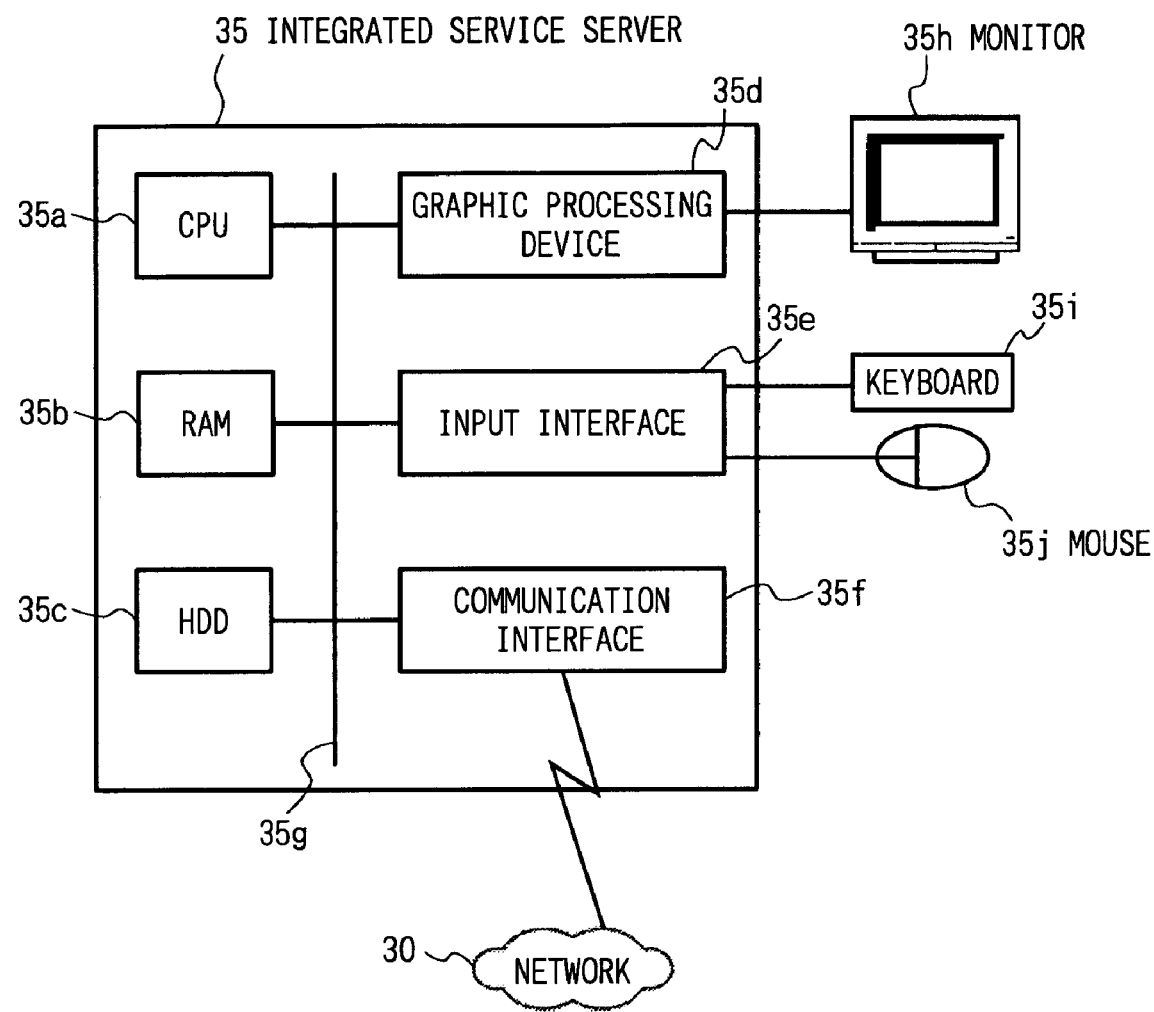
FIG. 6 is a hardware block diagram of an integrated service server.

Next, the internal configuration of the integrated service server 35 will be described. FIG. 6 is a hardware block diagram of an integrated service server. The integrated service server 35 shown in FIG. 6 is wholly controlled by a CPU 35a. A RAM 35b, an HDD 35c, a graphic processing device 35d, an input interface 35e, and a communication interface 35f are connected to the CPU 35a via a bus 35g.

The RAM 35b temporarily stores at least a portion of an OS (Operating System) program to be executed by the CPU 35a or application programs for providing various information to the terminal device 10. The RAM 35b also stores various data required for processing by the CPU 35a. The HDD 35c stores the OS or application programs for providing information.

A monitor 35h is connected to the graphic processing device 35d. Following an instruction from the CPU 35a, the graphic processing device 35d displays images on the display of the monitor 35h. A keyboard 35i and a mouse 35j are connected to the input interface 35e. The input interface 35e transmits signals transmitted by the keyboard 35i and the mouse 35j to the CPU 35a via the bus 35g.

The communication interface 35f is connected to the network 30. The communication interface 35f communicates with the terminal device 10 and various servers via the network 30. The integrated service server 35 is able to achieve the processing functions of the present embodiment through the afore-mentioned hardware configuration. Although the hardware configuration of the integrated service server 35 has been representatively explained in FIG. 6, other servers may also be realized using similar hardware configurations.

Next, user registration with the integrated service server 35 will be described. In order to receive services from the various servers, a user must complete user registration with the integrated service server 35. The user inputs information required for user registration into the terminal device 10 and transmits the input to the integrated service server 35, and obtains a user ID and a password. At this time, the user inputs a terminal ID into the terminal device 10. The terminal, ID is an identifier that identifies each terminal device when a user owns a plurality of terminal devices, and is arbitrarily input by the user. The terminal ID is then transmitted by the CPU 11 of the terminal device 10 to the integrated service server 35 to be registered, and at the same time is stored in the ROM 13 or the HDD 21 of the terminal device 10.

Figure 7:
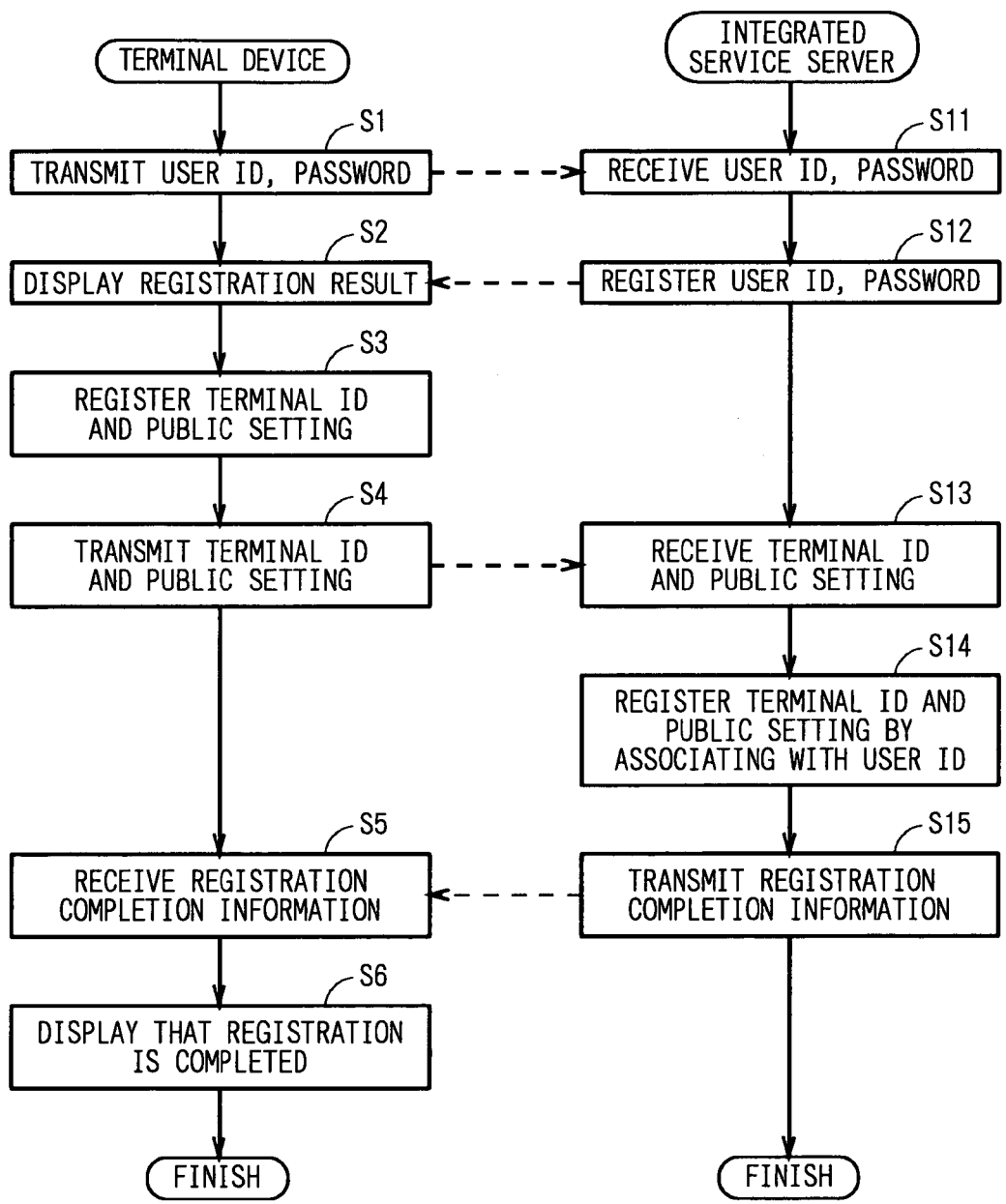
FIG. 7 is a sequential diagram showing the process flow of user registration.

The process flow of user registration with the integrated service server 35 from the terminal device 10 will now be explained with reference to FIG. 7. FIG. 7 is a sequential diagram showing the process flow of user registration.

In step S1, in order to register a user ID and a password input by a user's operations, the CPU 11 of the terminal device 10 transmits the user ID and password to the integrated service server 35 as a part of registration information. All communications between the terminal device 10 and the integrated service server 35 employ SSL (Secure Socket Layer), and are therefore arranged to prevent leakage of information to third parties.

In step S11, the CPU 35*a* of the integrated service server 35 receives the user ID and password as a part of registration information. In step S12, the CPU 35*a* compares the received user ID and password to a management table that manages such information, and after verifying that no duplicate user IDs exist, registers the user ID, and transmits that the registration was completed in the form of user registration completion information to the terminal device 10. If a duplicate user ID exists, the CPU 35*a* transmits a message prompting input of an alternate user ID to the terminal device 10, and makes the terminal device 10 transmit the alternate user ID and password inputted by the user.

In step S2, in response to the received user registration completion information, the CPU 11 of the terminal device 10 displays on the display device 17 that the registration of the user ID has been completed. In step S3, based on predetermined registration operations by the user, the CPU 11 stores the terminal ID and public setting to the HDD 21 of the terminal device 10. A public setting means configuring the settings so that the existence of the terminal device 10 is either made public (for example, over the network 30) to other users, or not.

In step S4, the CPU 11 transmits the terminal ID and the public setting to the integrated service server 35 as the remainder of the registration information. In step S13, the CPU 35*a* of the integrated service server 35 receives the terminal ID and the public setting, transmitted from the terminal device 10 as the remainder of the registration information.

In step S14, the CPU 35*a* registers the terminal ID and the public setting in the management table by associating them to a user ID. In step S15, the CPU 35*a* transmits registration completion information indicating that registration of the terminal ID and the public setting has been completed to the terminal device 10, and concludes processing for user registration at the integrated service server 35.

In step S5, the CPU 11 of the terminal device 10 receives registration completion information from the integrated service server 35. In step S6, the CPU 11 notifies the user that user registration has been completed by displaying as such on the display device 17, and concludes processing for user registration.

By the way, the CPU 11 of the terminal device 10 stores the user ID and password received from the user into the RAM 20. The CPU 11 also stores the received terminal ID into the ROM 13 or the HDD 21. Therefore, when there is a need to reaccess the server, unless erased by, for example, shut down, the user ID and password stored in the RAM 20 will be reused, thereby avoiding the trouble of reinput. The terminal ID is stored in the ROM 13 or the HDD 21 and therefore will not be erased.

Once receiving user authentication from the integrated service server 35, the user (terminal device 10) will be issued a ticket. This allows the terminal device 10 to access the various servers that actually provide service. The various servers determine whether or not the user of the terminal device 10 has been recently (for example, within the last minute) authenticated as a registered user by referring the registration completion time or the like included in the ticket. If it is determined that the user is authenticated, services corresponding to the request from the terminal device 10 are provided.

Figure 8:
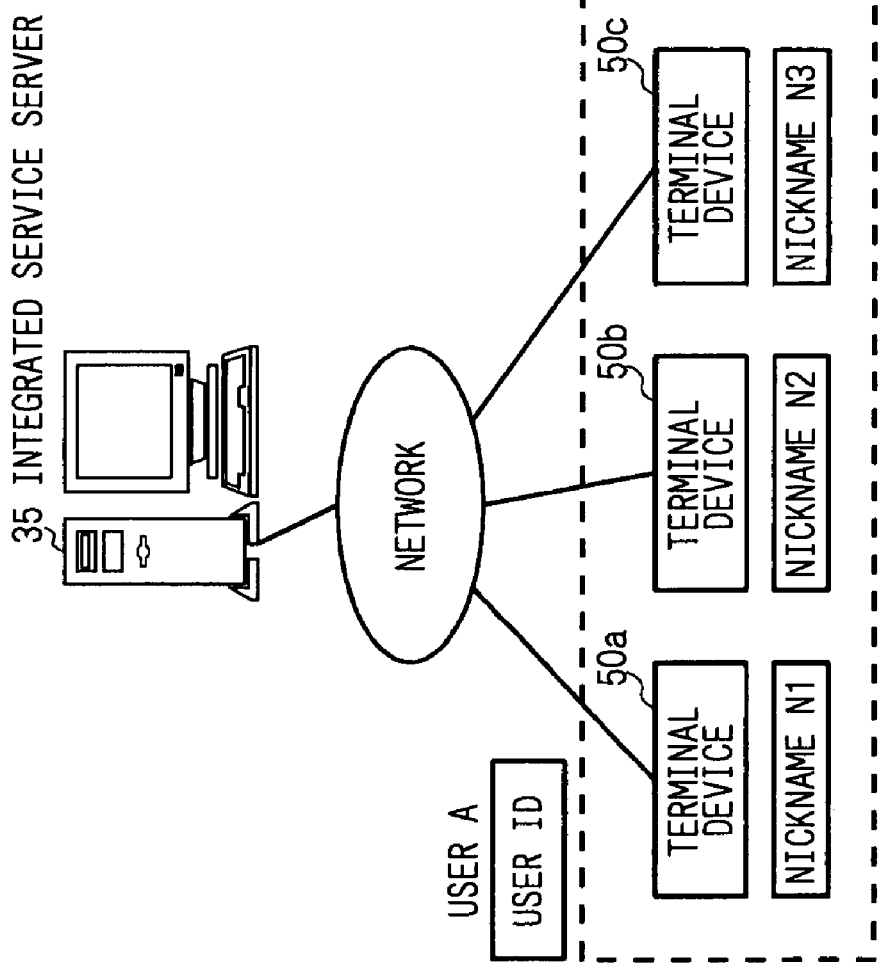
FIG. 8 is an explanatory diagram of registration types of a terminal device to an integrated service server.

Next, types of registration of a terminal device to an integrated service server will be described. FIG. 8 is an explanatory diagram of registration types of a terminal device to an integrated service server. In FIG. 8, terminal devices 50*a* to 50*c* externally resemble the terminal device 10 shown in FIG. 3, and have similar hardware blocks to that of the terminal device 10 shown in FIG. 4. It is assumed that user A owns the terminal devices 50*a* to 50*c*. By completing user registration with the integrated service server 35, user A may receive services provided by the CD title information providing server 31, the broadcast station server 32, and the music delivery server 33.

Now, assume that user A receives services (by completing user registration) from the integrated service server 35. User A will possess a user ID of his or her user registration with the integrated service server 35. The terminal devices 50*a* to 50*c* are respectively assigned nicknames N1 to N3 (terminal IDs) arbitrarily given by the user. The nicknames N1 to N3 are stored in the HDDs of the terminal devices 50*a* to 50*c*. In terminal devices owned by the same user, the nicknames (terminal IDs) are unique. However, in a terminal device that receives services from the integrated service server 35, the nickname does not have to be unique. In other words, identical nicknames may be used if not used by the same user. This enables determination of the target of service by a combination of a user ID and a nickname, and allows user A to receive services provided by the CD title information providing server 31, the broadcast station server 32, and the music delivery server 33. Nicknames may be arranged to be irrevocable once set.

Next, an auto demo will be described. When a user has not yet joined (has not yet completed user registration) the integrated service server 35, an auto demo prompting the user to join will be displayed on the display device 17 of the terminal device 10.

First, the CPU 11 of the terminal device 10 needs to determine whether or not the user has already joined the services of the integrated service server 35. This is determined by the terminal ID stored in the HDD 21. More specifically, if a terminal ID is stored in the HDD 21, the user is registered and the terminal device 10 does not have to perform an auto demo. On the other hand, if a terminal ID is not stored in the HDD 21, the terminal device 10 transmits device attribute information indicating its own performance and functionalities and a request signal requesting an auto demo to the integrated service server 35.

Upon receiving the device attribute information and a request signal requesting an auto demo from the terminal device 10, the CPU 35*a* of the integrated service server 35 transmits video data of an auto demo corresponding to the received device attribute information to the terminal device 10.

The CPU 11 of the terminal device 10 displays the received video data of the auto demo on the display device 17.

Figure 9:
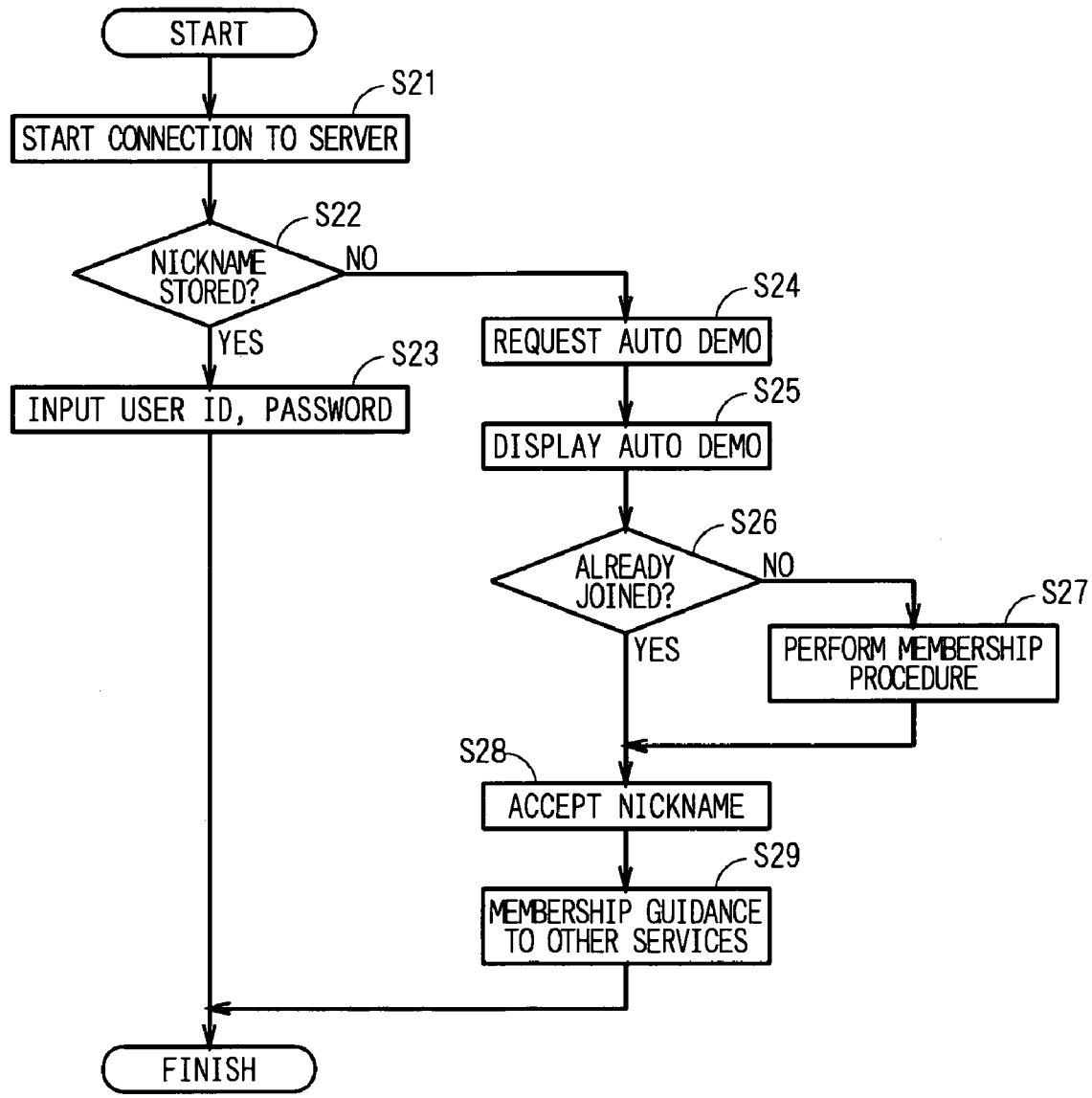
FIG. 9 is a flowchart showing the processing procedures at start of service.

The processing at the start of auto demo service will now be described in detail with reference to FIG. 9. FIG. 9 is a flowchart showing the processing procedures at start of service. In step S21, the CPU 11 of the terminal device 10 is connected to the integrated service server 35.

In step S22, the CPU 11 detects whether or not a nickname (terminal ID) is stored in the HDD 21. If a nickname is stored (i.e. if user registration has been completed), the process proceeds to step S23. If a nickname is not stored (i.e. if user registration has not been completed), the process proceeds to step S24.

In step S23, the CPU 11 receives a user ID and a password from the user, and transmits them to the integrated service server 35. Provision of service will commence upon authentication of the user ID and password by the integrated service server 35.

In step S24, the CPU 11 transmits device attribute information indicating the attributes of the terminal device 10 and a request signal requesting an auto demo to the integrated service server 35. Device attribute information is, for example, the capacity of the CPU 11, the displaying capacity of the display device 17, and the memory capacity of the RAM 20 which temporarily stores data of the auto demo. In addition, if the terminal device 10 is a portable device equipped with a battery, device attribute information will also include information regarding the presence of a battery.

In step S25, the CPU 11 receives data from the integrated service server 35 of an auto demo prompting the user to join the integrated service server 35, and displays it on the display device 17. In step S26, when the display of the auto demo ends, the CPU 11 accepts a user ID from the user. Input of the user ID allows determination of whether the user has already joined the service or not. If the user has not yet joined the service, the process proceeds to step S27. If the user has already joined the service, the process proceeds to step S28.

In step S27 the CPU 11 accepts joining procedures to the service. This is done in a similar way to the flow of user registration shown in FIG. 7. In step S28, the CPU 11 accepts nicknames from the user. The accepted nicknames are transmitted to the integrated service server 35. In step S29, the CPU 11 provides membership guidance to other services. Other services mean the services provided by the various servers linked from page information owned by the integrated service server 35. The CPU 11 requests the integrated service server 35 to transmit auto demos of membership guidance for the services provided by the various servers. In response to the request, the integrated service server 35 transmits data of auto demos of membership guidance to the terminal device 10. The terminal device 10 receives data of the auto demos of membership guidance, and displays them on the display device 17. By the way, this is not a requisite process.

The integrated service server 35 transmits data of auto demos according to the device attribute information transmitted from the terminal device 10. For example, if the capacity of the CPU 11 or the displaying ability of the display device 17 of the terminal device 10 are low, data with reduced image quality will be transmitted to enable displaying of the auto demo. In addition, if the memory capacity of the RAM 20 is limited, auto demo data with limited volume will be transmitted to accommodate the limited memory capacity. Furthermore, if a battery powers the terminal device 10, auto demo data with limited volume will be transmitted to avoid any wasting of power.

An auto demo of NowOnAir will next be described using diagrams showing exemplary screens. The FIGS. 10 to 13 are diagrams showing exemplary screens of an auto demo. The auto demo screen changes over time; in this case from FIG. 10 to FIG. 13.

Figure 10:
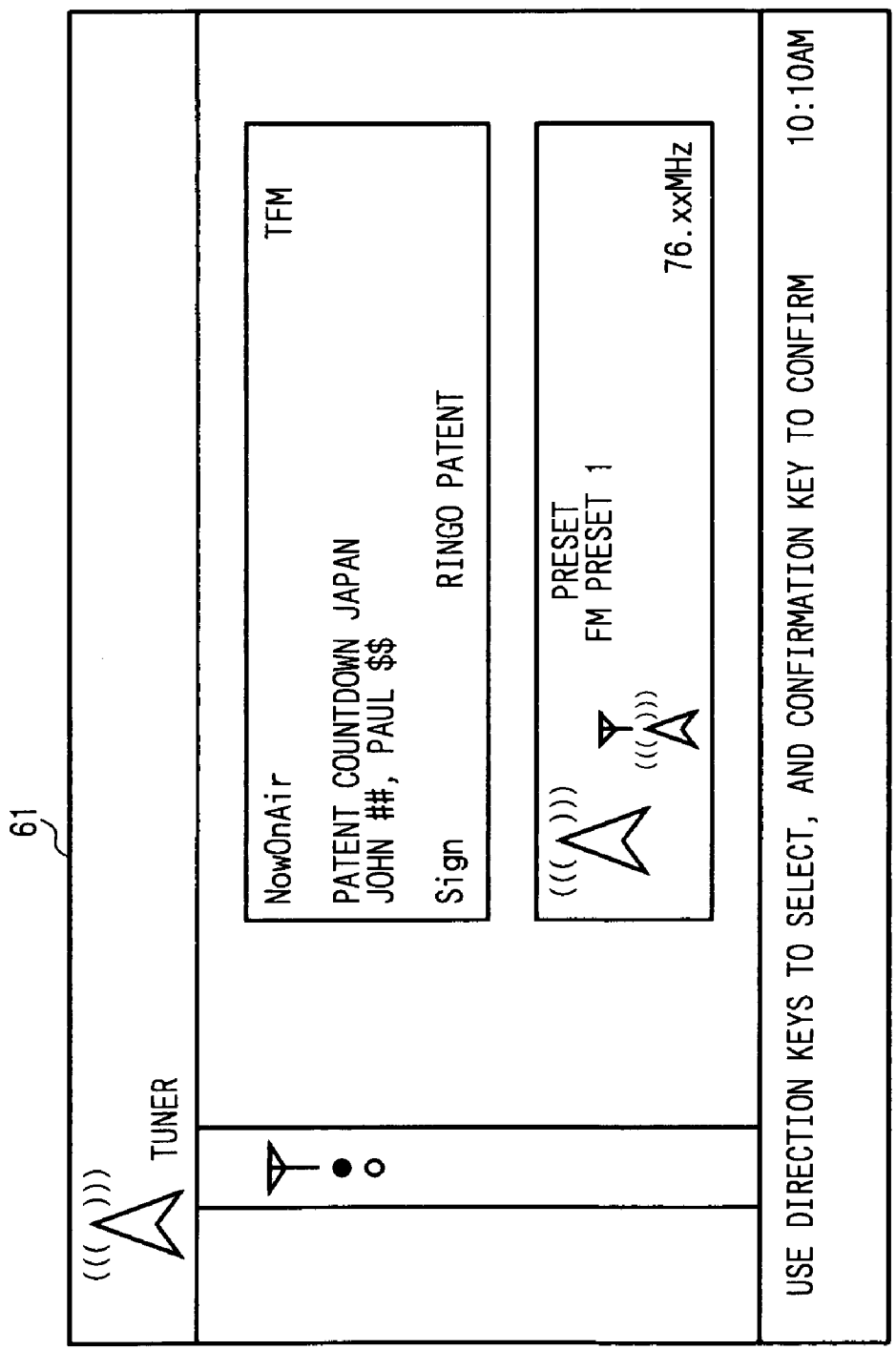
FIG. 10 is a first diagram showing an exemplary screen of an auto demo.

As shown by the screen 61 of FIG. 10, an auto demo screen of NowOnAir is displayed on the display device 17. The screen 61 displays a NowOnAir of the radio station TFM, wherein the name of the program, the name of the song currently on air and the name of the performer are displayed. In addition, a method for selecting information contained in NowOnAir is indicated. In this example, the radio frequency is 76.** MHz, the program name is "Countdown Japan (hosted by John ## and Paul $$)", the name of the song is "Sign", and the name of the performer is Ringo Patent. A method for selecting information contained in NowOnAir using direction and confirmation keys is indicated.

Figure 11:
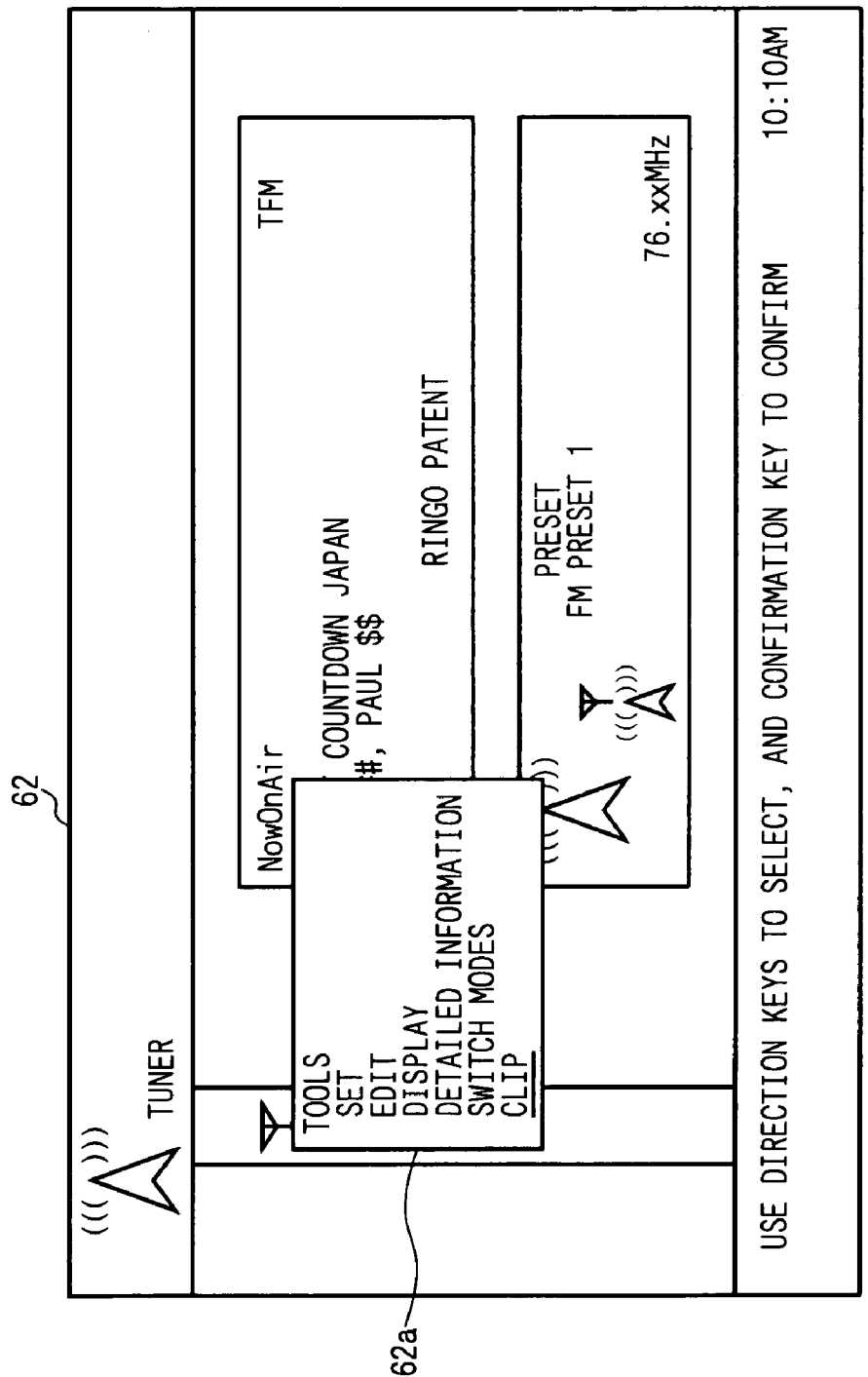
FIG. 11 is a second diagram showing an exemplary screen of an auto demo.

After a predetermined length of time, the screen 62 shown in FIG. 11 is displayed. In screen 62, a pop up menu 62a is shown. 62a represents a list of tools, and one of the tools, namely clipping, is currently underlined. Since this is an auto demo, these will be automatically displayed. In actual use, the pop up menu 62a is displayed by pressing a tool key 44 of the remote controller 40, and the tools will be selected from the list by using direction keys 41a to 41d.

After a further predetermined length of time, the screen 63 shown in FIG. 12 is displayed. In screen 63, a NowOnAir to be clipped to a clip folder is displayed. The screen 63 also displays NowOnAirs previously clipped.

After a further predetermined length of time, the screen 64 shown in FIG. 13 is displayed. In screen 64, a NowOnAir clipped to the clip folder is displayed.

As described above, the screen of an auto demo of a NowOnAir changes, and by demonstrating to the user how easily NowOnAirs can be clipped, prompts the user to join NowOnAir. It can also be arranged to display auto demos in sequence for the services other than NowOnAir.

As seen, when a terminal ID is input during user registration, the terminal device 10 stores the terminal ID into the HDD 21. Then, whether or not a user has completed user registration is determined by whether the terminal ID is stored in the HDD 21 or not. Therefore, reception of advertisement information in the event that a user has not registered with the integrated service server 35 is easily achieved.

In addition, since the terminal device 10 transmits device attribute information indicating its own attributes, and receives auto demos corresponding to the device attribute information, it is able to receive auto demos according to the performance and functionalities of the terminal device 10. Moreover, by displaying membership guidance of the services provided by the various servers onto the terminal device 10, the user will be able to gain knowledge on the services available.

Various processing according to the above-described embodiment may be provided by a program describing the contents of such various processing. In this case, by executing the program on a computer, the above-described processing functions will be achieved on the computer.

In other words, while various processing according to the above-described embodiment may be performed by the hardware configuration shown in FIG. 4, they can be also performed by software. In this case, the above-described processing is performed by installing a program comprising a software into a general purpose personal computer and the like that is able to perform processing according to a program installed, via a network or a storage media.

In addition, the program may be stored in a storage medium readable by a computer. Storage media that can be used for this purpose include, for example, magnetic disks (hard disk, floppy disk or the like) or magnetic tapes, optical disks (DVD, DVD-RAM, CD-ROM, CD-R (Recordable)/RW (Re-Writable), magneto-optical disks (MO: Magneto-Optical disk), semiconductor memories and the like.

A computer executing this program stores, for example, a program stored in a portable storage medium or a program transferred from a server, to its own storage device. The computer reads a program from its own storage, and executes processing according to the program. The computer may also read a program directly from the portable storage medium, and execute processing according to the program. The computer may also successively execute processing according to received programs whenever they are transferred from a server.

Furthermore, in the above-described embodiment, while a radio broadcast that is aired by a radio station was used as a broadcast receivable by the terminal device 10, the present invention is not limited to this application, and the terminal device 10 may be configured to receive Internet radio broadcast or satellite radio broadcast and obtain their respective related information, or to receive television broadcast that is aired by a television station and obtain various information and the like related to the television programs in the television broadcast from servers on the network.

Moreover, in the above embodiment, while the case of implementing the various circuits shown in FIG. 4 and the program modules shown in FIG. 5 to a terminal device 10 has been described, the present invention is not limited to this application, and these components may be implemented on various terminals other than the terminal device 10 such as a cellular phone or personal computer, which will be able to perform the same processing as the above-described terminal device 10 by implementing these components.

INDUSTRIAL APPLICABILITY

The present invention may be widely applied to systems providing services on networks.

The invention claimed is:

1. An information processing device for receiving service advertisement information, comprising:
    transmission means for transmitting user identification information which identifies users, a password, and device identification information which identifies the information processing device to a management device which manages the information processing device;
    receiving means for receiving registration completion information which indicates that said user identification information, said password and said device identification information were associated with each other and registered at said management device;
    storage means for storing at least said device identification information; and
    control means for controlling said transmission means to transmit device attribute information which indicates the attributes of said information processing device and request information which requests the service advertisement information in the event that said device identification information is not stored in said storage means, said device attribute information including information indicating the presence of a battery in the information processing device,
    wherein said receiving means receives the service advertisement information corresponding to said device attribute information in response to said request information.

2. The information processing device according to claim 1, wherein said service advertisement information is information that prompts user registration with said management device.

3. The information processing device according to claim 1, wherein said service advertisement information is information that prompts registration for services linked from said management device.

4. The information processing device according to claim 1, wherein said device attribute information includes performance of a display device on which said service advertisement information is displayed.

5. The information processing device according to claim 1, wherein said device attribute information including a memory capacity of a storage device in which said service advertisement information is stored.

6. An information management device for transmitting service advertisement information, comprising:
    receiving means for receiving from an information processing device user identification information which identifies users, a password, and device identification information which identifies the information processing device;
    transmission means for transmitting registration completion information which indicates that said user identification information, said password and said device identification information were associated with each other and registered;
    receiving means for receiving device attribute information which indicates the attributes of said information processing device and request information which requests the service advertisement information in the event that said device identification information is not stored by said information processing device, said device attribute information including information indicating the presence of a battery in the information processing device; and
    advertisement information transmission means for transmitting the service advertisement information corresponding to said device attribute information in response to said request information.

7. A communication method for an information processing device for receiving service advertisement information, comprising:
    transmitting user identification information which identifies users, a password, and device identification information which identifies the information processing device to a management device which manages the information processing device;
    receiving registration completion information which indicates that said user identification information, said password and said device identification information were associated with each other and registered at said management device;
    storing at least said device identification information;
    transmitting device attribute information which indicates the attributes of said information processing device and request information which requests the service advertisement information in the event that said device identification information is not stored by said information processing device, said device attribute information including information indicating the presence of a battery in the information processing device; and
    receiving the service advertisement information corresponding to said device attribute information in response to said request information.

8. A communication method for an information management device for transmitting service advertisement information to an information processing device, comprising:
    receiving user identification information which identifies users, a password, and device identification information which identifies the information processing device from an information processing device;
    transmitting registration completion information which indicates that said user identification information, said password and said device identification information were associated with each other and registered;
    receiving device attribute information which indicates the attributes of said information processing device and request information which requests the service advertisement information in the event that said device identification information is not stored by said information processing device, said device attribute information including information indicating the presence of a battery in the information processing device; and transmitting the service advertisement information corresponding to said device attribute information in response to said request information.

9. A computer readable storage medium including computer executable instructions, wherein the instructions, when executed by a processor, cause the processor to perform a method for receiving service advertisement information, the method comprising:

transmitting user identification information which identifies users, a password, and device identification information which identifies an information processing device to a management device which manages the information processing device;

receiving registration completion information which indicates that said user identification information, said password and said device identification information were associated with each other and registered at said management device;

storing at least said device identification information;

transmitting device attribute information which indicates the attributes of said information processing device and request information which requests the service advertisement information in the event that said device identification information is not stored in said storage means, said device attribute information including information indicating the presence of a battery in the information processing device; and receiving the service advertisement information corresponding to said device attribute information in response to said request information.

10. A computer readable storage medium including computer executable instructions, wherein the instructions, when executed by a processor, cause the processor to perform a method for transmitting service advertisement information to an information processing device, the method comprising:

receiving user identification information which identifies users, a password, and device identification information which identifies the information processing device from an information processing device;

transmitting registration completion information which indicates that said user identification information, said password and said device identification information were associated with each other and registered;

receiving device attribute information which indicates the attributes of said information processing device and request information which requests the service advertisement information in the event that said device identification information is not stored by said information processing device, said device attribute information including information indicating the presence of a battery in the information processing device; and transmitting the service advertisement information corresponding to said device attribute information in response to said request information.

11. An information processing device for receiving service advertisement information, comprising:

a transmitter configured to transmit user identification information which identifies users, a password, and device identification information which identifies the information processing device to a management device which manages the information processing device;

a receiver configured to receive registration completion information which indicates that said user identification information, said password and said device identification information were associated with each other and registered at said management device;

a storage unit configured to store at least said device identification information; and a controller configured to control said transmitter to transmit device attribute information which indicates the attributes of said information processing device and request information which requests the service advertisement information in the event that said device identification information is not stored in said storage unit, said device attribute information including information indicating the presence of a battery in the information processing device, wherein said receiver is configured to receive the service advertisement information corresponding to said device attribute information in response to said request information.

12. The information processing device according to claim 11, wherein said service advertisement information is information that prompts user registration with said management device.

13. The information processing device according to claim 11, wherein said service advertisement information is information that prompts registration for services linked from said management device.

14. The information processing device according to claim 11, wherein said device attribute information includes performance of a display device on which said service advertisement information is displayed.

15. The information processing device according to claim 11, wherein said device attribute information including a memory capacity of a storage device in which said service advertisement information is stored.

16. An information management device for transmitting service advertisement information to an information processing device, comprising:

a physical receiver configured to receive user identification information which identifies users, a password, and device identification information which identifies the information processing device from an information processing device, the physical receiver also configured to receive device attribute information which indicates the attributes of said information processing device and request information which requests the service advertisement information in the event that said device identification information is not stored by said information processing device, said device attribute information including information indicating the presence of a battery in the information processing device;

a physical transmitter configured to transmit registration completion information which indicates that said user identification information, said password and said device identification information were associated with each other and registered; and a physical service advertisement information transmitter configured to transmit the service advertisement information corresponding to said device identification information in response to said request information.

* * * * *